Feb. 6, 1923.
R. A. LIGHT ET AL
1,444,473
METHOD OF MAKING SEGMENTAL METALLIC PACKING RINGS
Filed Nov. 27, 1920      4 sheets-sheet 1
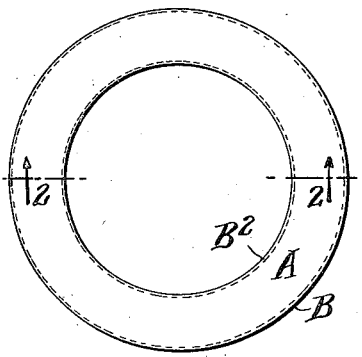
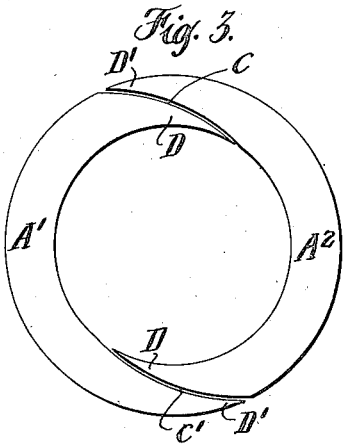
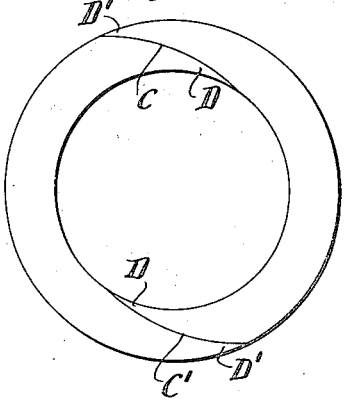
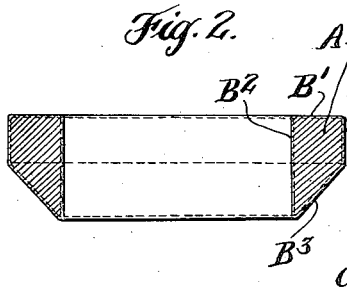
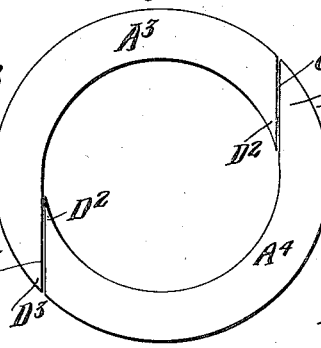
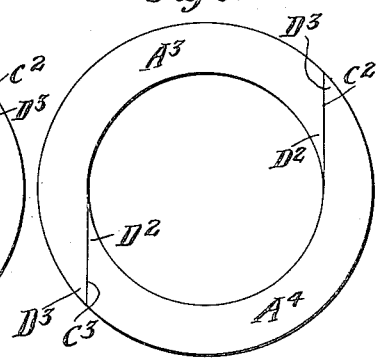
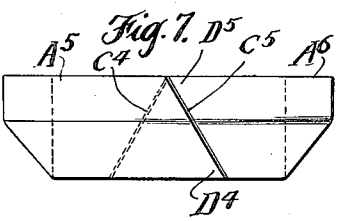
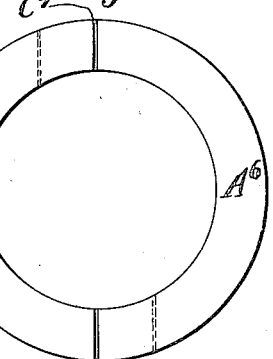
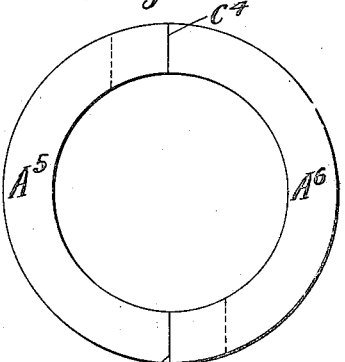
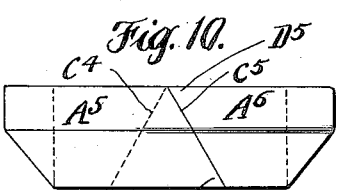
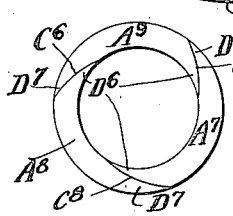
INVENTORS
Ralph A. Light
Joseph W. Price Jr
BY
ATTORNEY.

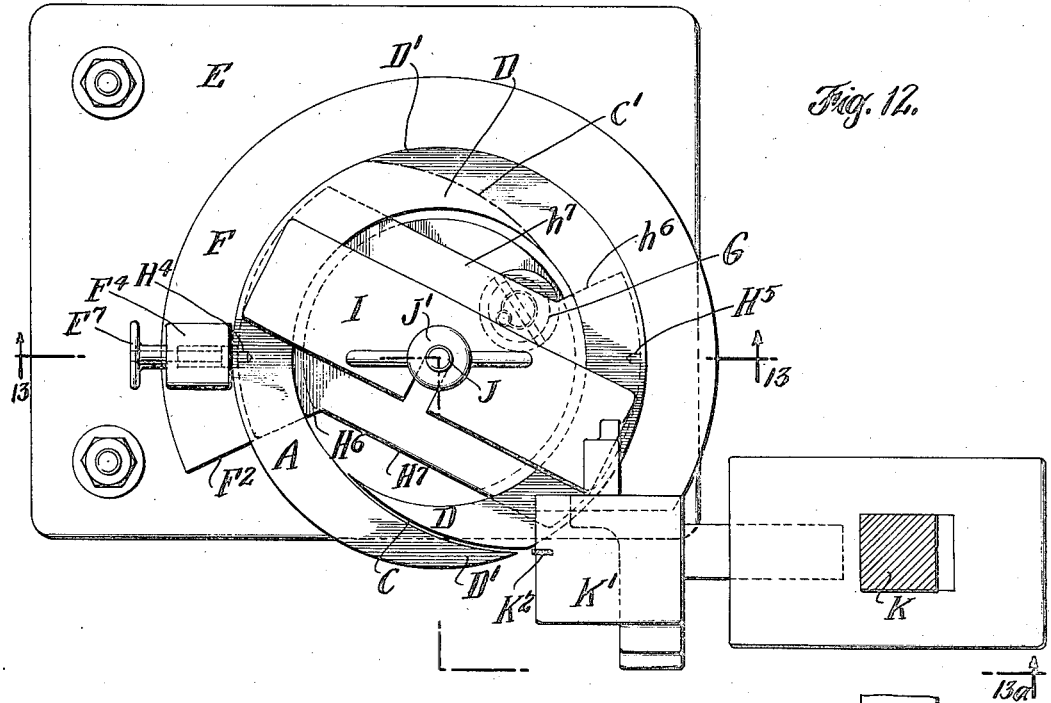
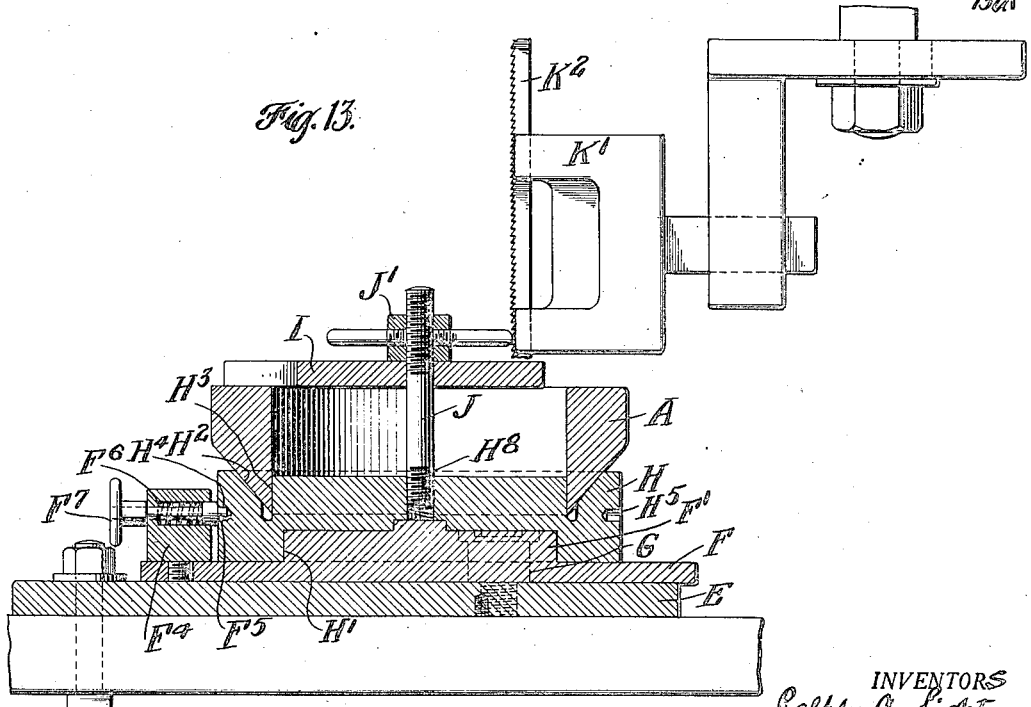

Patented Feb. 6, 1923.

1,444,473

UNITED STATES PATENT OFFICE.

RALPH A. LIGHT AND JOSEPH W. PRICE, JR., OF PHILADELPHIA, PENNSYLVANIA, ASSIGNORS TO THE UNITED STATES METALLIC PACKING COMPANY, OF PHILADELPHIA, PENNSYLVANIA, A CORPORATION OF PENNSYLVANIA.

METHOD OF MAKING SEGMENTAL METALLIC PACKING RINGS.

Application filed November 27, 1920. Serial No. 426,753.

*To all whom it may concern:*

Be it known that we, RALPH A. LIGHT and JOSEPH W. PRICE, Jr., citizens of the United States of America, and residents of Philadelphia, in the county of Philadelphia, in the State of Pennsylvania, have invented certain new and useful Improvements in Methods of Making Segmental Metallic Packing Rings, of which the following is a true and exact description, reference being had to the accompanying drawings, which form a part thereof.

Our invention relates to the manufacture of segmental metallic packing rings the segments of which have lapping ends. As heretofore constructed, such rings have been cast in segments and afterwards machined to bring them to suitable form to fit together in a packing ring. The drawbacks of this method are;—that it requires a separate mold for each segment,—that the mold has to be so formed as to provide for a casting having considerably more metal in its tapered portions than is required or permissible in the finished segment, both to insure the proper flow of the molten metal and the withdrawal of the casting without injury to the tapered ends,—that the tapered ends were liable to be bent, battered and broken in necessary handling,—and that a grinding finish was necessary for the lapping ends of the segments.

The object of our invention is to provide a method of manufacturing such rings which will be free from these drawbacks of the old method and at once cheaper and better and our invention consists, broadly speaking, in the method of making such segmental rings in which the complete ring is first cast as an integral casting and then dividing the casting into segments having lapping ends by saw cuts through the ring. For the best results the cast ring should be first machined to its designed form, then sawed into segments and the segments properly assembled, pressed in a chuck so as to force the lapping tapered ends into true contact with each other and generally conform the segments to the final designed form though as such rings are rebored before application to a rod, it is not necessary that the pressure should materially exceed that necessary to bring the lapping ends into true contact.

Our invention and our preferred appliances for carrying it into practical use will be understood as described in connection with the drawings in which Figure 1 is a plan view of an integral cast ring showing in dotted lines the metal to be removed by machining, preparatory to the sawing apart of the ring into segments.

Figure 2 is a cross section of the ring of Fig. 1.

Figure 3 is a plan view showing the ring divided into two lapping segments by saw cuts severing the ring on circular arcs.

Figure 4 is a similar view showing the ring as finally formed by pressing the assembled segments in a chuck.

Figure 5 is a plan view showing the ring divided into two lapping segments by parallel straight saw cuts.

Figure 6 is a similar view showing the ring after compression in a chuck.

Figure 7 is an elevation of the ring divided into two segments by straight saw cuts cutting the ring obliquely in different directions.

Figure 8 is a plan view of the ring as shown in Fig. 7.

Figure 9 is a similar plan view showing the segmental ring after compression.

Figure 10 is an elevation of the ring of Fig. 9.

Figure 11 is a plan view of a ring divided into three lapping segments.

Figure 12 is a plan view of the mechanism we have devised for sawing the integral ring into segments as shown in Fig. 3.

Figure 13 is a sectional elevation partly on line 13—13 and partly on line 13ª of Fig. 12.

A indicates the integral cast metal ring and at B, B', B² and B³, Fig. 2, we have indicated the machine cuts which should be made to give smooth surfaces and proper dimensions to the ring after it is cast. A' and A²; Figs. 3 and 4, indicate the two segments into which the cast ring is cut by saw cuts C and C', cutting the ring on circular arcs so as to form the tapered lapping edges D, D', of the familiar King packing ring. A³ and A⁴, Figs. 5 and 6, are the two segments into which the ring is divided by the parallel straight saw cuts C² and C³, D² and D³ indicating the tapered lapping ends of the ring so divided. A⁵ and A⁶ are the two segments into which the ring is divided by the oblique saw cuts C⁴ and C⁵, D⁴ and D⁵ indicating the lapping ends of the segments so formed. A⁷, A⁸ and A⁹ are the three segments into which the ring is divided as shown in Fig. 11, C⁶, C⁷ and C⁸ indicating the cuts and D⁶ and D⁷ the lapping ends of the segments.

E, Figs. 12 and 13, is the base plate of the sawing machine we have devised to sever the cast ring by cuts made on circular arcs as in Fig. 3. F is a chuck support having a cylindrical pivotal support F' for the chuck and pivoted on plate E by a pin G. The chuck support is cut away as indicated at F² so as not to come in contact with the saw blade when moved as hereinafter described. F⁴ is a latch support secured to the swinging support F and carrying in a suitable chamber a latch F⁵ pressed forward by a spring F⁶ and withdrawn, when desired, by a head F⁷. H is a chuck for supporting a ring. It is chambered out as shown at H' to fit on cylindrical pivot F' and at its top formed with the circular groove formed to receive and center a ring indicated at H², H³. H⁴ and H⁵ are lock receiving sockets formed on opposite sides of chuck H. The chuck H is cut away on both sides as indicated at H⁶, H⁷ and h⁶, h⁷ so as to clear the saw blade. I is a clamping plate for holding a ring in the chuck. It is clamped down on the end of a ring A by the screw rod J and nut J'. K indicates the framing of a band saw mechanism, K' being a guide head for the saw and K² the band saw. In the modified construction of Figs. 14 and 15, the base plate is indicated at E' and instead of a pivot pin G, straight guides G', G', are secured to its face. f is the chuck support formed to move in guides G'. h is the chuck pivotally supported as before on support f and cut away at H⁸, H⁸, to clear the saw blade.

Figure 16:
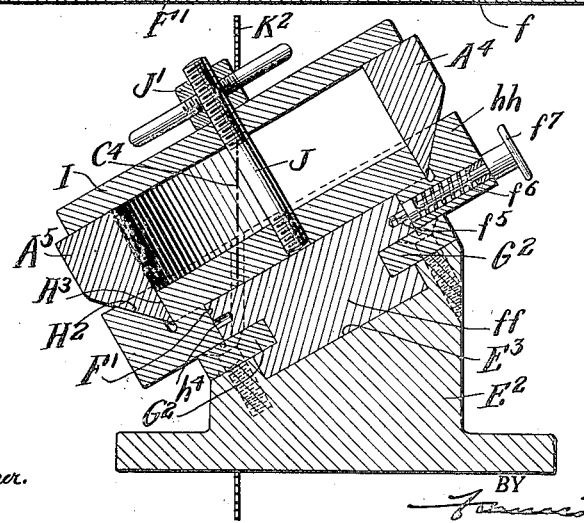
Figure 16 is a sectional elevation of another modification of our sawing mechanism as adapted to sever a ring as shown in Figs. 7 and 8.

In the construction of Fig. 16, the base indicated at E² is formed with an inclined surface E³ and provided with straight guideways G², G² in which moves the chuck supporting slide f, f. h, h, is the chuck pivotally supported on slide f, f, and in this construction chambered to carry a locking bolt f⁵ with spring f⁶ and head f⁷ which bolt engages in bolt holes h⁴ formed in the pivot F' of slide f, f.

The sawing mechanism shown and described is, we believe, novel and forms the subject matter of our copending application filed November 27, 1920, Serial No. 426,754.

Figure 17:
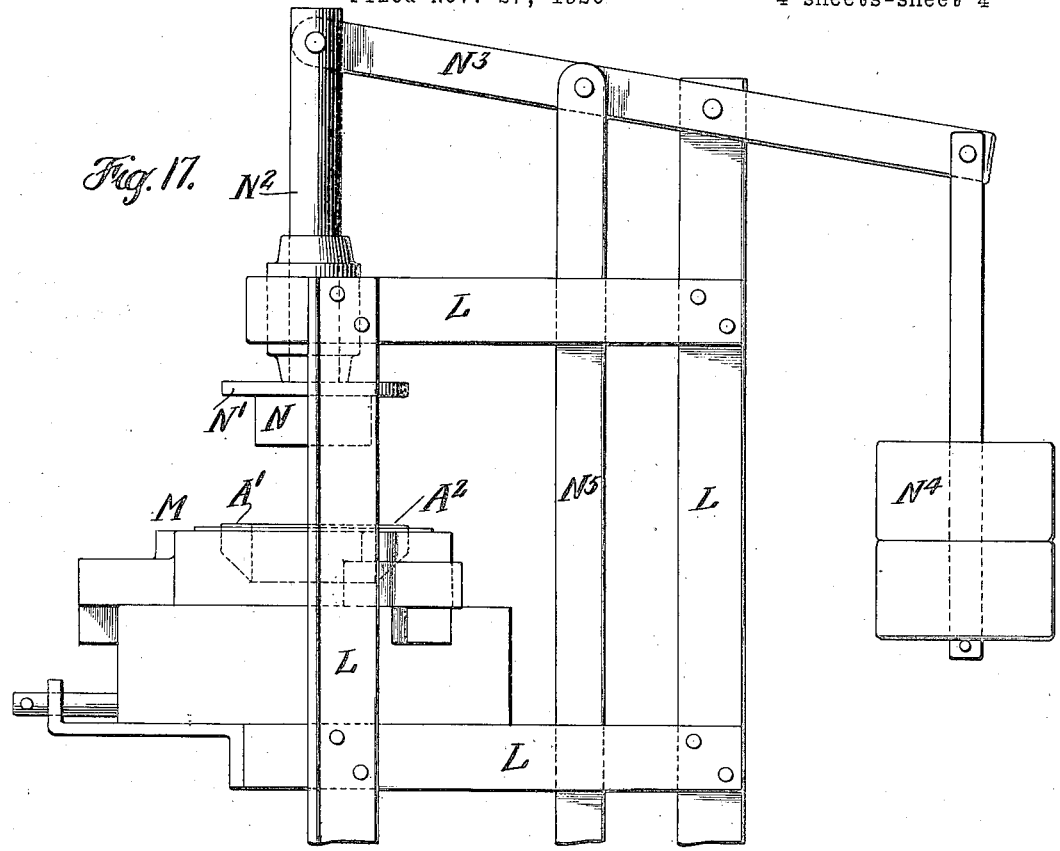
Figure 17 is an elevation showing parts of an apparatus for compressing a severed ring to give it final form.
Figure 18:
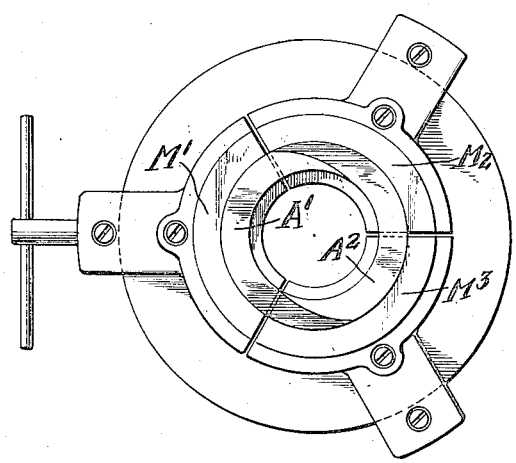
Figure 18 is a plan view of a three jawed chuck used in such compression.

L, Fig. 17, indicates a portion of the framing of the apparatus we use for compressing the rings after sawing. M is a three jawed chuck, the jaws being indicated at M', M², M³, and conformed to fit the outside of a ring as indicated. The chuck may be of any usual construction and mode of operation and is not therefore shown and described in detail. N is a vertically movable cylindrical chuck center formed to fit in the inside of a ring and provided with a flange N' which rests on top of the ring while it is being compressed in the chuck. N² is a reciprocating rod to which N is attached and which is actuated by a lever N³ and treadle rod N⁵, N⁴ being a counterweight which tends to hold center N in elevated position.

Figure 14:
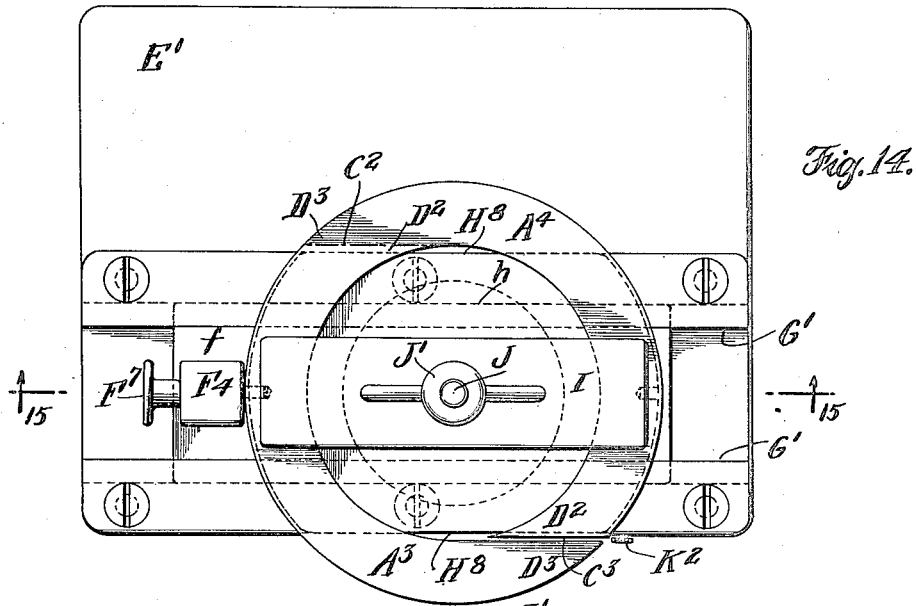
Figure 14 is a plan view of a modification of our sawing mechanism as adapted to sever a ring into segments, as shown in Fig. 5.
Figure 15:
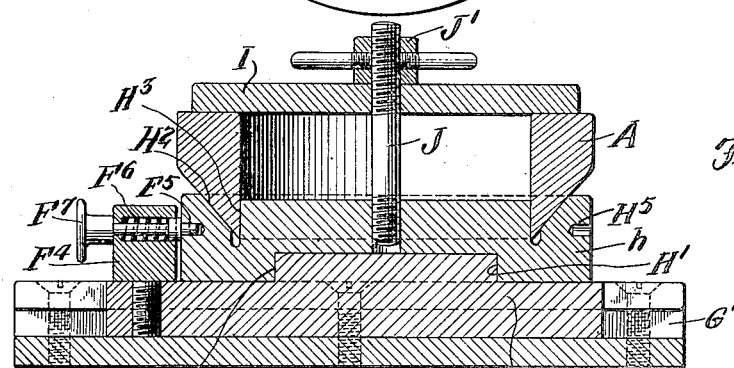
Figure 15 is a cross sectional elevation on line 15—15 of Fig. 14.

In practising our process with the described mechanism the ring A is first cast and then machined as indicated in Figs. 1 and 2. The machined ring is then clamped in a chuck H, h or h, h, according to the nature of the saw cuts to be made through it and the chuck locked in position on its pivotal support by the bolt F⁵. In the machine of Figs. 12 and 13 the chuck support is then turned on its pivot G and the ring A pressed against the saw blade K² which cuts through it making the cut C on a circular arc. The chuck support is then swung back to clear the saw, the bolt F⁵ is drawn back to unlock the chuck which is then rotatable on its pivot for 180° and relocked. Then the support F is again rotated on its pivot G and the second saw cut C' made in the ring severing it into two lapping segments A' and A². In the mechanism of Figs. 14, 15 and 16 the procedure is similar except that the chuck supports f or f, f, move in straight lines and the saw cuts the ring, in the one case on the lines C², C³ and in the other on the lines C⁴ and C⁶. The ring segments after the saw cuts are made do not fit closely together and when assembled are not quite symmetrical. We therefore place the assembled segments in the chuck M, bring the chuck center N down in the ring and compress the ring in the chuck with the result of so bending or compressing the segments, and particularly their lapping tapered ends, that they fit upon each other and a finished segmental ring is produced of approximately the correct form.

Having now described our invention, what we claim as new and desire to secure by Letters Patent, is:

1. The method of manufacturing segmental metallic packing rings adapted to form a tight joint on a rod which consists in casting an integral ring and dividing said ring into segments having lapping ends by continuous and symmetrical saw cuts extending through the ring without angular deviation.

2. The method of manufacturing segmental metallic packing rings adapted to form a tight joint on a rod which consists in casting an integral ring, machining the face of said ring to give it the desired form and finish and dividing said ring into segments having lapping ends by continuous and symmetrical saw cuts extending through the ring without angular deviation.

3. The method of manufacturing segmental metallic packing rings adapted to form a tight joint on a rod which consists in casting an integral ring and dividing said ring into segments having tapered lapping ends by continuous and symmetrical saw cuts extending through the ring on similar circular arcs.

4. The method of manufacturing segmental metallic packing rings which consists in casting an integral ring, dividing said ring into segments having lapping ends by sawing and subjecting the assembled segments to pressure to bring the lapping ends together and give final form to the ring.

5. The method of manufacturing segmental metallic packing rings which consists in casting an integral ring, machining the faces of said ring to give it the desired form and finish, dividing said machined ring into segments having lapping ends by sawing and subjecting the assembled segments to pressure to bring the lapping ends together and give final form to the ring.

6. The method of manufacturing segmental metallic packing rings which consists in casting an integral ring, dividing said ring into segments having tapered lapping ends by saw cuts severing the ring on similar circular arcs and subjecting the assembled segments to pressure to bring the lapping ends together and give final form to the ring.

7. The method of manufacturing segmental metallic packing rings which consists in casting an integral ring, machining the faces of said ring to give it the desired form and finish, dividing said machined ring into segments having tapered lapping ends by saw cuts severing the ring on similar circular arcs and subjecting the assembled segments to pressure to bring the lapping ends together and give final form to the ring.

RALPH A. LIGHT.
JOSEPH W. PRICE, Jr.